United States Patent [19]

den Hollander

[11] 4,013,923
[45] Mar. 22, 1977

[54] HIGH VOLTAGE REGULATION SYSTEM

[75] Inventor: Willem den Hollander, Schlieren, Switzerland

[73] Assignee: RCA Corporation, New York, N.Y.

[22] Filed: Mar. 22, 1976

[21] Appl. No.: 668,967

[30] Foreign Application Priority Data

Sept. 2, 1975 United Kingdom ............ 36089/75

[52] U.S. Cl. .............................. 315/411; 315/387
[51] Int. Cl.² ......................................... H01J 29/70
[58] Field of Search ............................ 315/411, 387

[56] References Cited

UNITED STATES PATENTS 3,885,198  5/1975  Pritchard et al. ................... 315/411
3,970,780  7/1976  Minoura ............................ 315/411

Primary Examiner—Maynard R. Wilbur
Assistant Examiner—T. M. Blum
Attorney, Agent, or Firm—Eugene M. Whitacre; Paul J. Rasmussen

[57] ABSTRACT

A switching regulator power supply which provides operating voltage for a deflection system which in turn provides the ultor voltage for a picture tube and which ultor voltage is subject to variation caused by picture tube beam loading is controlled by a single pulse, the timing of which synchronizes the regulator operation and the width of which is determined by a bias level on a transistor which is coupled to a pulse differentiating network, the bias being determined by the level of an ultor voltage representative signal.

5 Claims, 3 Drawing Figures

HIGH VOLTAGE REGULATION SYSTEM

BACKGROUND OF THE INVENTION

This invention relates to regulated power supplies for use with deflection systems.

It is common practice to derive the ultor potential for a cathode ray tube, such as a television picture tube, by the rectification of horizontal retrace pulses obtained from the deflection system associated with the picture tube. It is recognized that an increase in ultor voltage can be caused by an increase in line voltage which energizes the television receiver or a decrease in picture tube beam current, the latter often being referred to as a decrease in beam loading. An excessive high voltage condition could cause arcing within the picture tube which could destroy the tube or components associated therewith or could generate harmful x-radiation from the tube. The direct current supplying the deflection system can be regulated to substantially overcome an increase in high voltage caused by variations of line voltage or beam current.

One type of regulator useful with deflecting systems is a switching regulator in which the duty cycle of a switch interposed between a source of current and the deflection system is controlled to effect regulation. A switching regulator may be transformer coupled to the deflection system with the transformer serving an isolation function allowing the regulator to be connected to the incoming power line whereas the deflection system can be isolated from the power line. Such a switching regulator is disclosed in copending U.S. application Ser. No. 607,512 filed Aug. 25, 1975 and entitled "Synchronized And Regulated Power Supply". That application discloses an arrangement in which an oscillator pulse is transformer coupled to the regulator to synchronize the operation of the power supply to the horizontal deflection rate to minimize the effects of switching, the transformer serving to isolate the oscillator from the power supply. The amplitude of the pulse is representative of variations of the deflection system direct current variations caused by power line variations. With this arrangement the number of connections between the isolated and non-isolated portions of the receiver is reduced. It would be desirable to further regulate such an arrangement against variations in high voltage caused by beam loading and still keep the number of connections between isolated and non-isolated chassis portions to a minimum.

SUMMARY OF THE INVENTION

A switching regulator power supply provides operating voltage for a deflection system which in turn provides ultor voltage for a cathode ray tube, which ultor voltage is subject to variation caused by tube beam loading. The regulator switching is synchronized by a sync pulse coupled thereto. The sync pulse width is determined by a control signal coupled to a transistor stage which includes a differentiating network for differentiating the sync pulse. The control signal is developed by sensing means coupled to an ultor voltage representative signal.

DESCRIPTION OF THE INVENTION

Figure 1:
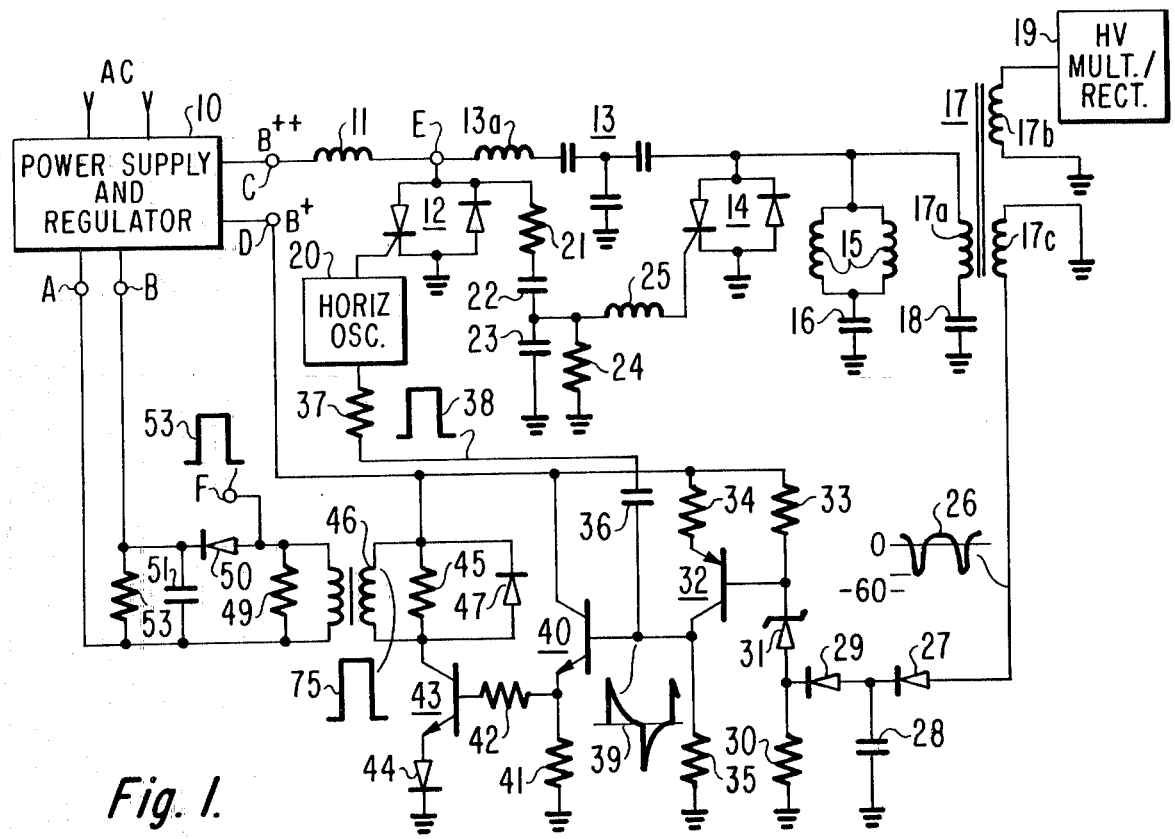
FIG. 1 is a block and schematic circuit diagram of a deflection system utilizing a high voltage regulation system in accordance with the invention.

In FIG. 1 a power supply and regulator 10 converts alternating current to regulated direct current available at output terminals B and C. Terminal C is coupled to a horizontal deflection system similar to the two bi-directional conducting switch type utilizing silicon control rectifiers (SCR) as disclosed in U.S. Pat. No. 3,452,244.

The direct current at terminal C is coupled through an input reactor 11 to a commutating switch 12 which is gated into conduction during the commutating portion of each deflection cycle by sync pulses obtained from a horizontal oscillator 20. Energy stored in input reactor 11 is utilized to charge the commutating and auxiliary capacitors 13 through a commutating coil 13a. A trace switch 14 controlled by gate drive signals obtained from a voltage divider including resistor 21, capacitor 22 and capacitor 23 coupled across commutating switch 12 and a waveshaping network including resistor 24 and inductor 25 permits scanning current to flow through horizontal deflection windings 15 and S-shaping capacitor 16. Horizontal rate current also flows through a primary winding 17a and coupling capacitor 18 to energize transformer 17 during each horizontal deflection cycle. A tertiary winding 17b of the horizontal output and high voltage transformer supplies horizontal retrace pulses to a high voltage multiplier and rectifier assembly 19 for producing a direct current high voltage suitable for application to the ultor terminal of a television picture tube.

Since the picture tube ultor voltage is derived from the horizontal deflection circuit it is desirable to regulate the high voltage against variations caused by variations in beam current of the picture tube as a result of video signal modulation. A regulated high voltage direct current substantially eliminates the possibility of television receiver component damage or possible excessive X-ray radiation sometimes associated with excessive high voltage applied to the picture tube. The remainder of the circuit in FIG. 1 and the illustrative embodiments in FIG. 2 and FIG. 3 of the power supply and regulator 10 of FIG. 1 provide for control of the B+ supply at terminal C resulting in a regulated high voltage direct current.

The periodic voltage waveform 26 obtained from a secondary winding 17c is rectified and filtered by diode 27 and capacitor 28. This positive voltage is coupled through a blocking diode 29 to the junction of a resistor 30 and a zener diode 31. The series combination of the biasing resistor 33, zener diode 31 and resistor 30 provides for a quiescent current through transistor 32 which has its main conduction path coupled to a source of B+ at terminal D through resistors 34 and 35. Zener diode 31 level shifts the voltage across capacitor 28 to an appropriate drive level for transistor 32. An increase in the amount of positive voltage passed through diode 29 as a result of a rise in the voltage waveforms of transformer 17 is coupled across zener diode 31 and results in a decrease in conduction of transistor 32, the effect of which will be explained subsequently.

Horizontal oscillator 20 provides horizontal rate sync pulses 38 which are coupled through a resistor 37 and a capacitor 36 to the junction of the collector electrode of transistor 32 and the base electrode of transistor 40. Resistor 35 also coupled to the collector of transistor 32 together with capacitor 36 forms part of a differentiating network which differentiates the voltage waveform 38 as illustrated by the voltage waveform 39. Transistor 40 comprises an emitter follower stage with a high input impedance does not influence the time constant of the differentiating network consisting of capacitor 36 and resistor 35 to any significant extent. The collector of transistor 32 is also connected to the differentiating network, but because the collector impedance of a transistor is high, this will also not load the differentiator. Thus the shape of pulses 39 will not change with a variation in conduction of transistor 32, but the DC level will change. The width of pulse 75 is dependent on the time during which transistor 43 is in conduction, which will be the case when the voltage on the base of transistor 40 exceeds a value which is the sum of the base-emitter voltage of transistor 40, the base-emitter value of transistor 43 and the forward conducting voltage of diode 44. Thus when the DC level of pulses 39 is changed by varying the conduction of transistor 32 the conduction time of transistor 43 is changed. The width of pulses 75 will increase when the high voltage decreases. The amplitude of the pulses 75 is the B+ voltage on terminal D decreased with the saturation voltage of transistor 43 and the forward voltage of diode 44. The amplitude is therefore representative of any B+ variations due to input power line voltage changes. Diode 47 on the primary of transformer 46 protects the transistor 43 from overvoltage. Pulses 75 appear on the secondary of the transformer but the average level becomes zero. Although the peak-to-peak value does not change the peak-to-zero amplitude is dependent on the duty cycle. Thus, because pulses 75 have a constant repetition frequency, the peak-to-zero amplitude is dependent on the pulse width.

Pulses 75 are coupled through transformer 46 and any transients are damped by resistor 49. The pulses may be obtained as a pulse 53 at terminal F. These pulses are used to synchronize the switching of switching regulator power supply 10. Diode 50, capacitor 51 and resistor 52 form a peak detector network which provides to terminal B of power supply and regulator 10 a smooth analog voltage representative of variations in the high voltage direct current and the direct current voltage at terminal D.

In FIG. 1 the pulses 75 are coupled through transformer 46 which provides for isolation of the secondary side of transformer 17 from the input line voltage. This isolation is desirable in order that any direct current obtained from additional windings of transformer 17 and utilized to energize other portions of the television receiver is referenced to the receiver chassis ground. This eliminates the relatively expensive power transformer which would otherwise be required to obtain isolation from the line in the television chassis. With this isolated arrangement the return for the clamping and detecting circuitry is through terminal A of power supply 10.

Figure 2:
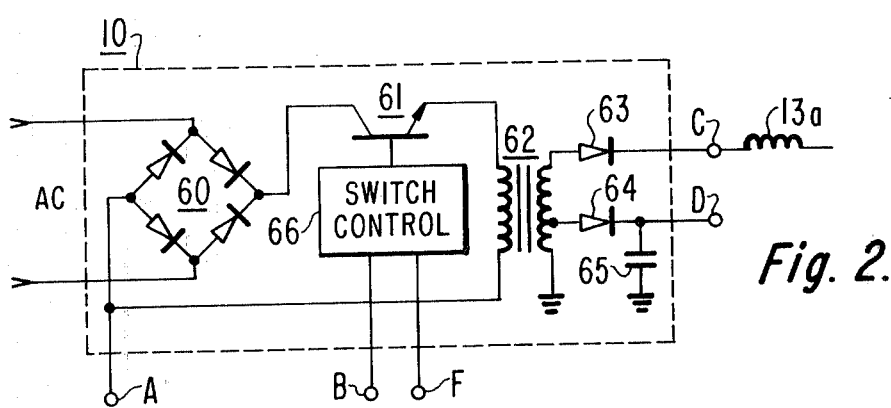
FIGS. 2 and 3 illustrate in more detail power supplies which may be utilized with the system of FIG. 1.

FIG. 2 illustrates a switched mode power supply, similar to that disclosed in British Provisional Application 24861/75 filed June 10, 1975, which may be utilized in block 10 of FIG. 1 to provide for isolated operation of the receiver. The input line is coupled to a bridge rectifier 60 and the positive direct current is coupled to a switching transistor 61 which energizes the primary of a switching regulator transformer 62. The secondary of transformer 62 is coupled through a diode 63 which rectifies the switched square waveform and provides direct current at terminal C for operating the horizontal deflection circuit. When the arrangement of FIG. 2 is utilized, input reactor 11 of FIG. 1 may be eliminated and terminal C is coupled directly to commutating coil 13a as illustrated in FIG. 2, the secondary winding of transformer 62 effectively serving as a source of stored energy which obviates the requirement of input reactor 11. A tap on the secondary of transformer 62 is coupled through a diode 64 and a filter capacitor 65 so that a lower level of B+ may be obtained at terminal D for energizing the sensing portion of the regulator circuit of FIG. 1. It is noted that the switching regulator transformer 62 serves as an isolation transformer, the secondary winding being coupled to chassis ground thereby permitting all of the deflection circuitry to be isolated from the input line. Switching transistor 61 has its off and on states controlled by a suitable switched control circuit 66 which receives as its input signals the analog control voltage at terminal B and synchronizing pulse information at terminal F. Thus, the switching is synchronized at the horizontal deflection rate to eliminate a source of interference with the video signal presentation and the off-on intervals of each regulating cycle are controlled by the analog voltage coupled to terminal B. Switch control 66, for example, may include a multivibrator stage responsive to the analog signal at terminal B which multivibrator has its duty cycle varied in response to the control voltage for varying the off-on state of transistor 61 and hence the level of B+ obtained at terminals C and D.

Figure 3:
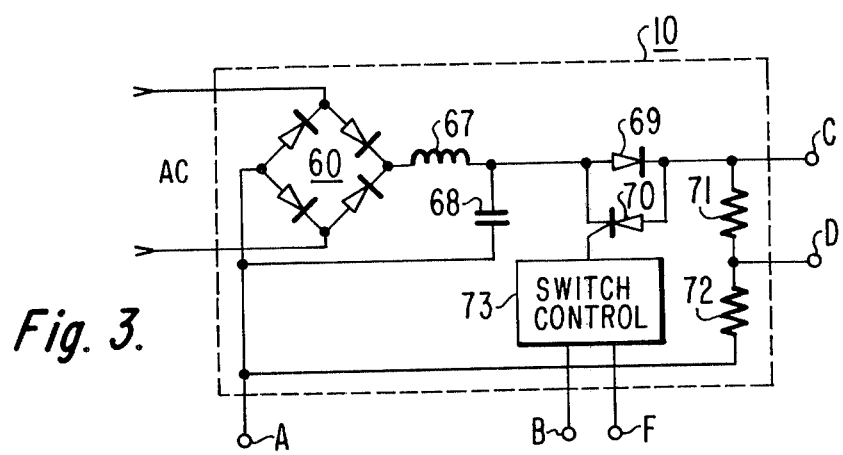

FIG. 3 illustrates another general type of regulator which may also utilize the analog control signals obtained from the circuit of FIG. 1. The ac line voltage is rectified by bridge rectifier 60 and the pulsating direct current is smoothed by a filter network including a choke 67 and a capacitor 68. The direct current is then passed through diode 69 to terminal C for energizing the horizontal deflection circuit of FIG. 1. Resistors 71 and 72 coupled across the power supply provide at their junction a lower level of B+ which is coupled to terminal D to energize the sensing circuit of FIG. 1. The synchronizing pulses 53 are coupled from terminal F to switch control 73 and the analog control voltage is coupled through terminal B to the switch control.

In the arrangement of FIG. 3, SCR 70 is gated on at the appropriate time as determined by sensing pulse 53 coupled to terminal F for an amount of time determined by the analog voltage coupled to terminal B. Thus, switch control 73 provides a phase control for the conduction of SCR 70. As is known, conduction of SCR 70 permits the energy stored in the commutating network 13 and 13a of FIG. 1 to be discharged through SCR 70 back to the power supply to maintain the desired level of energy in the deflection circuit for achieving regulated high voltage in the television receiver. The embodiment of FIG. 3 does not provide for an isolated chassis operation. However, if desired an isolation power transformer may be inserted in the ac line before bridge rectifier 60 so that the entire chassis may be isolated.

What is claimed is:

1. A high voltage regulating system comprising:
    a switching regulator power supply;
    a deflection system coupled to said supply for receiving operating current therefrom for producing periodic retrace voltage pulses suitable for rectification for providing an ultor potential for a cathode ray tube;

a source of sync pulses coupled to said deflection system for synchronizing said periodic pulses; and power supply control means coupled to a source of periodic voltage waveforms in said deflection system, said source of sync pulses and said power supply, said control means including:

a differentiating network for differentiating said sync pulses;

a transistor stage coupled to said differentiating network for receiving differentiated pulses therefrom;

means for developing a first control signal representative of the level of said periodic waveforms and applying said first control signal to said transistor stage to control the bias thereon for controlling the width of said differentiated sync pulses obtained from said transistor stage; and means for developing a second control signal from said width-modulated sync pulses and for coupling said second control signal to said switching power supply for controlling the duty cycle of said switching.

2. A high voltage regulating system according to claim 1 wherein said means for developing a first control signal includes means for rectifying and filtering said periodic waveforms for developing said control signal representative of the average level of said periodic waveforms.

3. A high voltage regulating system according to claim 2 wherein said width-modulated sync pulses are coupled to said switching regulator power supply for synchronizing the switching operation thereof.

4. A high voltage regulating system according to claim 3 wherein said means for developing a second control signal includes means for developing an average voltage the level of which varies with the duration of said width-modulated sync pulse.

5. A high voltage regulating system according to claim 4 wherein said width-modulated sync pulses are transformer coupled to said means for developing said second control signal.

* * * * *